(12) United States Patent
Ahmed et al.

(10) Patent No.: US 12,483,376 B2
(45) Date of Patent: Nov. 25, 2025

(54) TRANSMISSION OF NR CONTROL INFORMATION IN AN LTE DOWNLINK SUBFRAME

(71) Applicant: Telefonaktiebolaget LM Ericsson (publ), Stockholm (SE)

(72) Inventors: Saad Naveed Ahmed, Sundbyberg (SE); Karl Mann, Ottawa (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 289 days.

(21) Appl. No.: 18/036,293

(22) PCT Filed: May 19, 2021

(86) PCT No.: PCT/SE2021/050473
§ 371 (c)(1),
(2) Date: May 10, 2023

(87) PCT Pub. No.: WO2022/131986
PCT Pub. Date: Jun. 23, 2022

(65) Prior Publication Data
US 2024/0048344 A1 Feb. 8, 2024

Related U.S. Application Data

(60) Provisional application No. 63/127,512, filed on Dec. 18, 2020.

(51) Int. Cl.
*H04L 5/00* (2006.01)
*H04W 52/32* (2009.01)
*H04W 72/20* (2023.01)

(52) U.S. Cl.
CPC ......... *H04L 5/0094* (2013.01); *H04W 52/325* (2013.01); *H04W 72/20* (2023.01)

(58) Field of Classification Search
None
See application file for complete search history.

(56) References Cited

U.S. PATENT DOCUMENTS

| | | | |
|---|---|---|---|
| 8,634,363 B2 * | 1/2014 | Kim | ............... H04L 1/0003 370/332 |
| 8,934,421 B2 | 1/2015 | Chen et al. | |

(Continued)

FOREIGN PATENT DOCUMENTS

| | | |
|---|---|---|
| CN | 102893550 A | 1/2013 |
| CN | 104969650 A | 10/2015 |

(Continued)

OTHER PUBLICATIONS

3rd Generation Partnership Project, "3rd Generation Partnership Project; Technical Specification Group Radio Access Network; NR; Physical layer procedures for data (Release 15)", 3GPP TS 38.214 V15.3.0 (Sep. 2018), Technical Specification, pp. 1-96.

(Continued)

*Primary Examiner* — Brandon M Renner
(74) *Attorney, Agent, or Firm* — COATS & BENNETT, PLLC

(57) ABSTRACT

There is provided mechanisms for transmission of NR control information in a LTE downlink subframe. At least two symbols in the subframe are allocatable for LTE control information. A method is performed by a network node. The method comprises obtaining information that the symbol at index 1 in the subframe allocatable for LTE control information is to be allocated to the NR control information. The method comprises, in response thereto, configuring resource elements for LTE transmission and resource elements for NR transmission within the subframe. The resource elements for LTE transmission in the symbol at index 1 in the subframe are to be muted. The NR control information is (Continued)

allocated to resource elements of the symbol at index 1 in the subframe. The method comprises initiating transmission of the subframe.

18 Claims, 10 Drawing Sheets

(56) References Cited

U.S. PATENT DOCUMENTS

| | | | |
|---|---|---|---|
| 10,605,890 | B1 | 3/2020 | Yun et al. |
| 11,159,206 | B2 | 10/2021 | Huss et al. |
| 11,902,957 | B2 | 2/2024 | Bontu et al. |
| 2014/0086353 | A1 | 3/2014 | Ni et al. |
| 2015/0208394 | A1 | 7/2015 | Seo et al. |
| 2015/0208435 | A1 | 7/2015 | Zhu et al. |
| 2015/0341877 | A1 | 11/2015 | Yi et al. |
| 2016/0286407 | A1 | 9/2016 | Simonsson et al. |
| 2016/0302175 | A1 | 10/2016 | Blankenship et al. |
| 2018/0049165 | A1 | 2/2018 | Byun et al. |
| 2018/0070369 | A1 | 3/2018 | Papasakellariou |
| 2018/0316472 | A1 | 11/2018 | John Wilson et al. |
| 2018/0351591 | A1 | 12/2018 | Fakoorian et al. |
| 2019/0246394 | A1 | 8/2019 | Asplund et al. |
| 2019/0364520 | A1 | 11/2019 | Kazmi et al. |
| 2019/0380140 | A1 | 12/2019 | Wong et al. |
| 2019/0386807 | A1 | 12/2019 | Kazmi et al. |
| 2020/0068556 | A1 | 2/2020 | Tiirola et al. |
| 2020/0084698 | A1 | 3/2020 | Rune et al. |
| 2020/0099560 | A1 | 3/2020 | Li et al. |
| 2020/0169990 | A1 | 5/2020 | Takeda et al. |
| 2020/0177287 | A1 | 6/2020 | Yu et al. |
| 2020/0288501 | A1 | 9/2020 | Takeda et al. |
| 2020/0344809 | A1 | 10/2020 | Svedman et al. |
| 2020/0358481 | A1 | 11/2020 | Huss et al. |
| 2021/0152306 | A1* | 5/2021 | Liu ........................ H04W 88/04 |
| 2021/0235477 | A1 | 7/2021 | Baldemair et al. |
| 2021/0282170 | A1 | 9/2021 | Falconetti et al. |
| 2021/0289509 | A1* | 9/2021 | Saito ................ H04L 27/26025 |
| 2021/0329591 | A1* | 10/2021 | Hwang ................ H04L 5/0051 |
| 2022/0394762 | A1* | 12/2022 | Bhattad ............. H04W 74/0808 |

FOREIGN PATENT DOCUMENTS

| | | |
|---|---|---|
| CN | 107432020 A | 12/2017 |
| EP | 3500003 A1 | 6/2019 |
| TW | 201822560 A | 6/2018 |
| WO | 2014166110 A1 | 10/2014 |
| WO | 2018097680 A1 | 5/2018 |
| WO | 2018127339 A1 | 7/2018 |
| WO | 2020190186 A1 | 9/2020 |

OTHER PUBLICATIONS

Nokia, et al., "Extension of the Dynamic Spectrum Sharing (DSS) WID", 3GPP TSG RAN meeting #89, e-Meeting, Sep. 14-18, 2020, RP-201761, pp. 1-3.

Orange, et al., "Architecture options in Rel-15", 3GPP TSG RAN#78, TDoc RP-172627, Dec. 18-21, 2017, Agenda Item 9.2.1., Lisbon, Portugal, pp. 1-5.

Intel Corporation, "Physical Downlink Control Channel Design for NR", 3GPP TSG RAN WG1 NR Ad-Hoc Meeting, Spokane, USA, Jan. 16-20, 2017, pp. 1-5, R1-1700359.

* cited by examiner

TRANSMISSION OF NR CONTROL INFORMATION IN AN LTE DOWNLINK SUBFRAME

TECHNICAL FIELD

Embodiments presented herein relate to a method, a network node, a computer program, and a computer program product for transmission of New Radio control information in a Long Term Evolution downlink subframe, where at least two symbols in the subframe are allocatable for Long Term Evolution control information.

BACKGROUND

NR (New Radio) is the air interface specified for the fifth generation (5G) telecommunications systems according to the third generation partnership project 3GPP. NR might be regarded as a further development, with enhanced functionality and performance, of the Long Term Evolution (LTE) air interface.

Mobile network operators that deploy NR typically have access to, or have been allocated, existing frequency spectrum on multiple frequency bands where LTE signalling is currently deployed. Initially, the fraction of NR capable user equipment might be limited comparted to LTE capable user equipment and therefore a large part of the existing frequency spectrum might still need to be allocated for LTE signalling.

There are several architecture options for how to deploy NR together with LTE.

One option is to use LTE as the main air interface whilst NR is added using dual connectivity in non-standalone mode. With dual connectivity, both the LTE air interface and the NR air interface can be used in parallel for data transmission (and reception). In the downlink (i.e., in the direction from radio access network node on the network side towards user equipment on the user side) the data transmission is split at the Packet Data Convergence Protocol (PDCP) layer and can use either one of the air interfaces (i.e., LTE or NR) or both. In uplink (i.e., in the direction from user equipment on the user side towards radio access network node on the network side) the data received from the two air interfaces are combined in the PDCP layer at the radio access network node.

To have an efficient frequency spectrum utilization, it is possible to overlay an NR carrier in the same frequency spectrum as an LTE carrier. This is made possible by flexible locations of control channels and signals, and by rate matching around common reference signals (CRS) and synchronization signals (such as primary synchronization signals (PSSs), secondary synchronization signals (SSSs)), and physical broadcast channel (PBCH) that are always transmitted in an LTE carrier. Hence, different CRS port configurations could be used for such rate matching.

A side effect of dynamically sharing the spectrum is that the NR control channel becomes constrained to only 1 symbol in a 4 CRS port configuration due to the presence of LTE CRS in first two symbols, and a lack of NR user equipment support for the control channel beyond the third symbol in the subframe. This significantly caps the number of simultaneous scheduled users and hampers the efficient use of spectrum. FIG. 1 illustrates parts of a subframe in terms of the LTE CRS for port index 2 and port index 3. As can be seen in the figure, the LTE CRS occupy the first two symbols. LTE CRS resource elements (RE) that are transmitted in symbols at index 1 and index 8 (i.e., the second and ninth symbols) in each subframe.

A first alternative is therefore to use a 2 CRS port configuration, where the LTE CRS is not present in the symbol at index 1 (i.e., the second symbol). This enables an easy trade off of the control channel capacity between LTE and NR in the second symbol in each subframe. This may be suitable for deployments under 1 GHz, since user equipment for LTE usually have less than four antenna ports, as needed for 4 layer reception. However, this would not be suitable above 1 GHz where the loss in throughput performance for LTE could be unacceptable.

A second alternative is therefore to rely on advanced user equipment capabilities to decode a specific type of data channel, namely the physical downlink shared channel (PDSCH) of type B, see 3GPP TS 38.214 entitled "NR; Physical layer procedures for data", Version 16.3.0, Table 5.1.2.1-1) in order to increase the NR control channel capacity. However, besides its effectiveness depending on the ratio of supportive user equipment to take advantage of the NR control channel in symbol 3, this is deemed to be a complex alternative which is both costly and impacts the NR data throughput performance.

Hence, there is still a need for improved joint downlink NR and LTE transmissions.

SUMMARY

An object of embodiments herein is to provide efficient joint downlink NR and LTE transmission that does not suffer from the issues noted above, or at least where the issues noted above are mitigated or reduced.

According to a first aspect there is presented a method for transmission of NR control information in a LTE downlink subframe. At least two symbols in the subframe are allocatable for LTE control information. The method is performed by a network node. The method comprises obtaining information that the symbol at index 1 in the subframe allocatable for LTE control information is to be allocated to the NR control information. The method comprises, in response thereto, configuring resource elements for LTE transmission and resource elements for NR transmission within the subframe. The resource elements for LTE transmission in the symbol at index 1 in the subframe are to be muted. The NR control information is allocated to resource elements of the symbol at index 1 in the subframe. The method comprises initiating transmission of the subframe.

According to a second aspect there is presented a network node for transmission of NR control information in a LTE downlink subframe. At least two symbols in the subframe are allocatable for LTE control information. The network node comprises processing circuitry. The processing circuitry is configured to cause the network node to obtain information that the symbol at index 1 in the subframe allocatable for LTE control information is to be allocated to the NR control information. The processing circuitry is configured to cause the network node to, in response thereto, configure resource elements for LTE transmission and resource elements for NR transmission within the subframe. The resource elements for LTE transmission in the symbol at index 1 in the subframe are to be muted. The NR control information is allocated to resource elements of the symbol at index 1 in the subframe. The processing circuitry is configured to cause the network node to initiate transmission of the subframe.

According to a third aspect there is presented a network node for transmission of NR control information in a LTE downlink subframe. At least two symbols in the subframe are allocatable for LTE control information. The network node comprises an obtain module configured to obtain information that the symbol at index 1 in the subframe allocatable for LTE control information is to be allocated to the NR control information. The network node comprises a configure module configured to, in response thereto, configure resource elements for LTE transmission and resource elements for NR transmission within the subframe. The resource elements for LTE transmission in the symbol at index 1 in the subframe are to be muted. The NR control information is allocated to resource elements of the symbol at index 1 in the subframe. The network node comprises an initiate module configured to initiate transmission of the subframe.

According to a fourth aspect there is presented a computer program for transmission of NR control information in an LTE downlink subframe, the computer program comprising computer program code which, when run on a network node, causes the network node to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously, these aspects provide efficient joint downlink NR and LTE transmission.

Advantageously, these aspects provide joint downlink NR and LTE transmission that does not suffer from the issues noted above.

Advantageously, these aspects enable a capacity increase for the downlink control information for NR.

Advantageously, these aspects enable better utilization of the NR data channel than the first alternative disclosed above.

Advantageously, these aspects require a lower implementational complexity than the second alternative disclosed above.

Other objectives, features and advantages of the enclosed embodiments will be apparent from the following detailed disclosure, from the attached dependent enumerated embodiments as well as from the drawings.

Generally, all terms used in the enclosed claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 2:
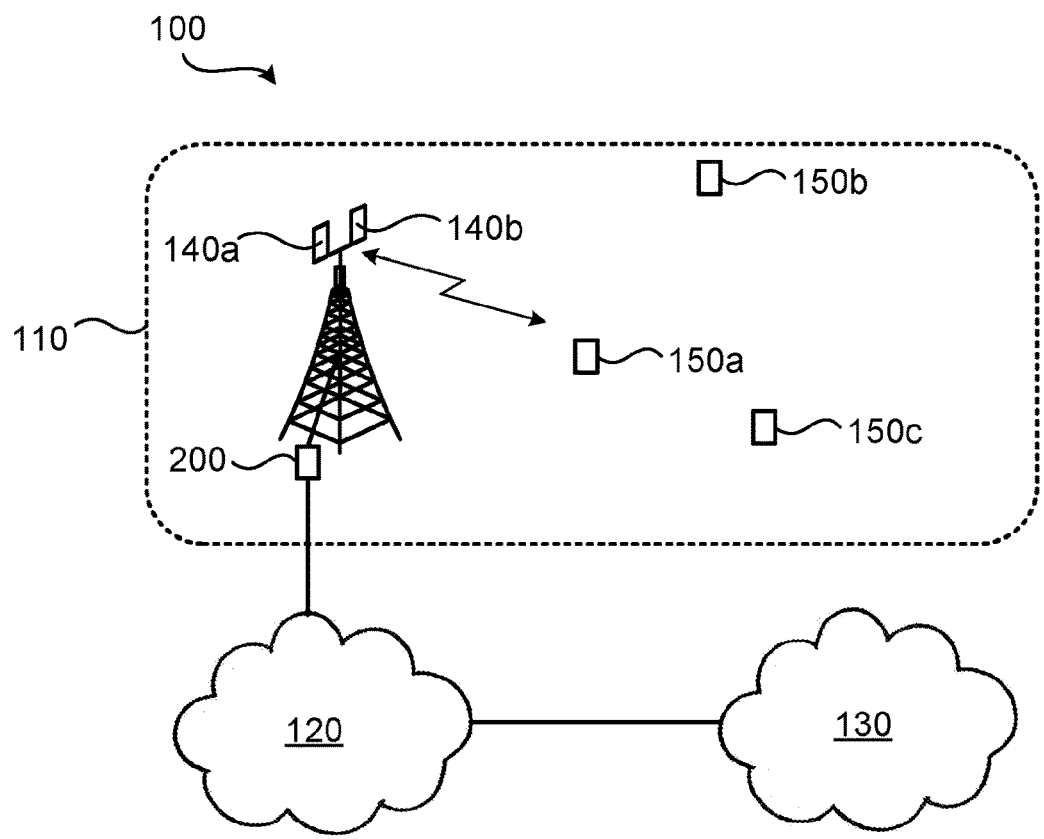
FIG. 2 is a schematic diagram illustrating a communications network according to embodiments.

FIG. 2 is a schematic diagram illustrating a communications network 100 where embodiments presented herein can be applied. The communications network 100 comprises a network node 200 configured to provide network access to user equipment, as represented by user equipment 150a, 150b, 150c, in a radio access network 110. The radio access network 110 is operatively connected to a core network 120. The core network 120 is in turn operatively connected to a service network 130, such as the Internet. The user equipment 150a,150b, 150c are thereby enabled to, via the network node 200, access services of, and exchange data with, the service network 130. Some of the user equipment 150a,150b, 150c might be configured to communicate with the network node 200 using LTE signalling, some of the user equipment 150a,150b, 150c might be configured to communicate with the network node 200 using NR signalling, and some of the user equipment 150a,150b, 150c might be configured to communicate with the network node 200 using both LTE signalling and NR signalling.

The network node 200 comprises, is collocated with, is integrated with, or is in operational communications with, an antenna system comprising co-sited antennas 140a, 140b. In some implementations, one of the antennas 140a might be configured for LTE signalling whereas the other of the antennas 140b might be configured for NR signalling. In other implementations, both antennas 140a, 140b are configured for both LTE signalling and NR signalling.

Examples of network nodes 200 are radio access network nodes, radio base stations, base transceiver stations, Node Bs, evolved Node Bs, gNBs, access points, access nodes, and backhaul nodes. Examples of user equipment 150a, 150b, 150C are terminal devices, wireless devices, mobile stations, mobile phones, handsets, wireless local loop phones, smartphones, laptop computers, tablet computers, network equipped sensors, network equipped vehicles, and so-called Internet of Things devices.

As noted above there is still a need for improved joint downlink NR and LTE transmissions.

In this respect, there are at least four alternatives that could be applied to address issues of capacity for NR control information relating to the use of the second symbol for LTE control information in a 4 CRS port deployment. According to a first alternative, the NR control information of whose transmission is in conflict with the transmission of the LTE control information is substituted or punctured. According to a second alternative, the NR control information is rate matched around the resource elements for the LTE control information. According to a third alternative, the NR control information is simultaneously transmitted with the LTE control information. According to a fourth alternative, the NR control information is transmitted whilst suppressing the transmission of those of the resource elements for the LTE control information that are in conflict with the resource elements for the NR control information.

According to at least some of the herein disclosed embodiments there is therefore proposed methods to increase the capacity for NR control information without compromising the capacity for NR data transmission in a multi-radio access technology system with shared spectrum between LTE and NR.

The embodiments disclosed herein in particular relate to mechanisms for transmission of NR control information in an LTE downlink subframe, and within resource elements that are allocatable for LTE control information. In order to obtain such mechanisms there is provided a network node 200, a method performed by the network node 200, a computer program product comprising code, for example in the form of a computer program, that when run on a network node 200, causes the network node 200 to perform the method.

In some aspects it is assumed that LTE and NR are sharing a common spectrum, and that a 4 CRS port configuration is used in LTE. In some aspects, a default configuration of symbols for control information in each subframe is provided. According to a first default configuration, three symbols (at indices 0, 1, and 2) are allocated to control information for LTE, and zero symbols are allocated to control information for NR. The first default configuration could apply in cases when LTE has high demand for control channel capacity, and NR does not, or if LTE has higher priority.

According to a second default configuration, one or two symbols (at index 0 or at indices 0 and 1) are allocated to control information for LTE, and zero or one symbols (at no index or at index 2) are allocated to control information for NR. The second default configuration could apply in cases when LTE has low demand for control channel capacity, or NR has higher priority.

As will be further disclosed below, according to the herein disclosed embodiments, one symbol (at index 0) is allocated to control information for LTE, and two symbols (at indices 1 and 2) are allocated to control information for NR. According to a variant, one of the symbols allocated to the control information for NR is instead allocated to downlink data transmission for NR.

Figure 3:
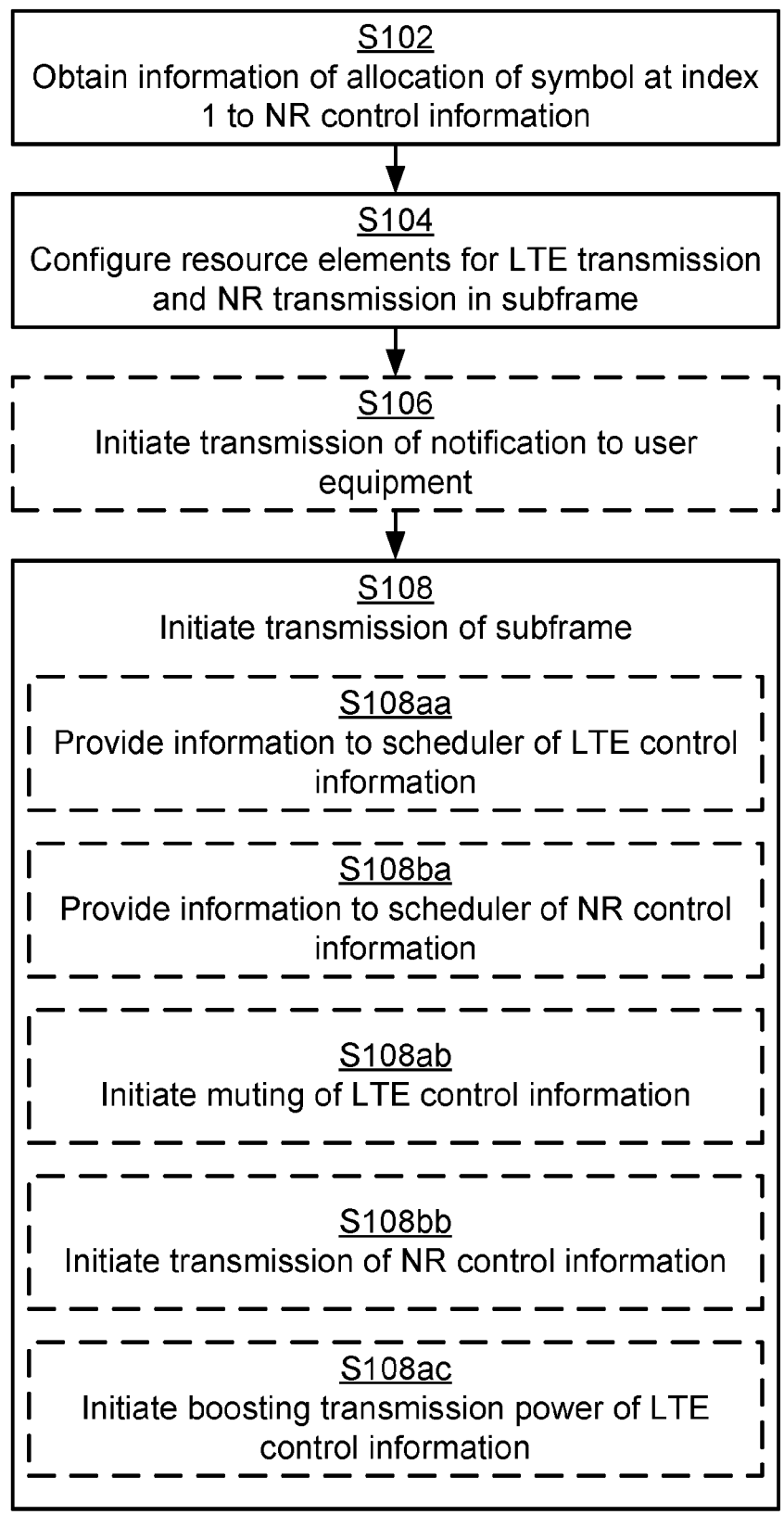
FIGS. 3, 5, 6, and 7 are flowcharts of methods according to embodiments.

FIG. 3 is a flowchart illustrating embodiments of methods for transmission of NR control information in an LTE downlink subframe. At least two symbols in the subframe are allocatable for LTE control information. The methods are performed by the network node 200. The methods are advantageously provided as computer programs 1120.

S102: The network node 200 obtains information that the symbol at index 1 in the subframe allocatable for LTE control information is to be allocated to the NR control information.

S104: The network node 200, in response thereto, configures resource elements for LTE transmission and resource elements for NR transmission within the subframe. The resource elements for LTE transmission in the symbol at index 1 in the subframe are to be muted. The NR control information is allocated to resource elements of the symbol at index 1 in the subframe.

S108: The network node 200 initiates transmission of the subframe.

Embodiments relating to further details of transmission of NR control information in an LTE downlink subframe as performed by the network node 200 will now be disclosed.

There could be different types of NR control information and LTE control information as different channels on which the NR control information and the LTE control information is sent. In some embodiments, the LTE control information is transmitted on an LTE physical downlink control channel (PDCCH). One type of LTE control information transmitted on the PDCCH is CRSs. In this respect, according to the present disclosure, all information transmitted on the PDCCH is referred to as control information, which thus also includes the CRS, although CRSs as such do not qualify as control information. Therefore, in some embodiments, the LTE control information is an CRS. Further, in some embodiments, the NR control information is transmitted on an NR PDCCH.

There could be different ways for the network node 200 to in step S102 obtain the information that the symbol at index 1 in the subframe allocatable for LTE control information is to be allocated to the NR control information. In some aspects, the information is defined by, is a result of, or otherwise depends on, a scheduling decision. That is, in some embodiments, that the symbol at index 1 in the subframe allocatable for LTE control information is to be allocated to the NR control information is a result of a scheduling decision taken for the LTE control information and the NR control information. As illustrated in below referenced FIG. 4, the decision regarding allocation of resource elements for LTE control information and NR control information might have been taken by a shared PDCCH allocator based on information that the shared PDCCH allocator obtains from an LTE scheduler and an NR scheduler. There could be different such scheduling decisions. In some embodiments, the scheduling decision is based on a condition comparing a need for NR traffic to a need for LTE traffic. The need for NR traffic and the need for LTE traffic might be compared in terms of priority. That is, in some embodiments, the condition pertains to relative priority between the NR traffic and the LTE traffic, and, as a result of the NR traffic having highest relative priority, the symbol at index 1 in the subframe is to be allocated to the NR control information.

In some aspects, the NR control information is to be transmitted in less than all subcarriers of the LTE downlink subframe. That is, in some aspects, the NR control information is allocated to less than all resource elements of the symbol at index 1 in the subframe. More specifically, the NR control information might be allocated to resource elements of the symbol at index 1 in the subframe only within a range of physical resource blocks (PRBs). In some aspects, the information obtained by the network node 200 in step S102 therefore specifies a range of PRBs in which the symbol at index 1 in the subframe allocatable for LTE control information is to be allocated to the NR control information. Muting of the LTE control information is then in step S104 initiated only for the specified range of PRBs.

User equipment configured for LTE signalling might use the LTE control information for various purposes, such as channel estimation, channel status reporting and cell measurements. In some aspects, different types of compensation schemes are utilized to mitigate any performance loss that the user equipment configured for LTE signalling might experience due to the muting of a symbol used for transmission of the LTE control information. One such mitigation scheme involves notifying the user equipment configured for LTE signalling to refrain from measuring on the symbol used for transmission of the LTE control information. Therefore, in some embodiment, the network node 200 is configured to perform (optional) step S106:

S106: The network node 200 initiates transmission of a notification to user equipment 150a, 150b, 150c monitoring the LTE control information that the user equipment 150a, 150b, 150c should refrain from monitoring the symbol at index 1 in the subframe.

This might avoid the user equipment 150a, 150b, 150c to monitor and measure on a symbol that has been muted. Avoiding such measurements in moments where the LTE control information is muted may avoid the user equipment 150a, 150b, 150C to form erroneous channel state information (CSI) reports. The user equipment 150a, 150b, 150c might otherwise perform measurement on a CRS that has been muted, resulting in an erroneous CSI value.

According to another compensation scheme, the network node 200 is configured to compensate received CSI reports, such as CSI reports used for link adaptation purposes, that are based on measurements on muted LTE control information. The compensation is based on an estimated degradation of the CSI value, caused by the muted LTE control information.

Yet another compensation scheme, as will be further disclosed below, involves boosting transmission power of the LTE control information at another symbol in the subframe.

There could be different ways in which the transmission of the subframe is initiated in step S108.

In some aspects, as will be illustrated below with reference to FIG. 4, the transmission of the LTE control information is handled by an LTE scheduler and the transmission of the NR control information is handled by an NR scheduler. The transmission of the subframe might therefore be initiated by providing information of the configured resource elements to the LTE scheduler and the NR scheduler. Hence, in some embodiments, the network node 200 is configured to perform (optional) steps S108aa and S108ba as part of initiating the transmission of the subframe in step S108:

S108aa: The network node 200 provides information of the configured resource elements for the LTE transmission to a scheduler of the LTE control information.

S108ba: The network node 200 provides information of the configured resource elements for the NR transmission to a scheduler of the NR control information.

Steps S108aa and S108ba might be performed by a shared PDCCH allocator of the network node 200.

In further embodiments, the network node 200 is configured to perform (optional) steps S108ab and S108bb as part of initiating the transmission of the subframe in step S108:

S108ab: The network node 200 initiates, for a transmitter of the LTE control information, muting of the LTE control information in the symbol at index 1 in the subframe.

S108bb: The network node 200 initiates, for a transmitter of the NR control information, transmission of the NR control information in the symbol at index 1 in the subframe.

Step S108ab might be performed by an LTE scheduler of the network node 200. Step S108bb might be performed by an NR scheduler of the network node 200.

As disclosed above, in some aspects, the NR control information is to be transmitted in less than all subcarriers of the LTE downlink subframe and the NR control information might be allocated to resource elements of the symbol at index 1 in the subframe only within a range of PRBs. Therefore, the network node 200 might in step S108aa specify the range of PRBs in which the resource elements for the LTE transmission in the symbol at index 1 in the subframe are to be muted. Likewise, the network node 200 might in step S108ba specify the range of PRBs to which the resource elements for the NR control information is allocated at index 1 in the subframe. Further, if a downlink data transmission, such as data transmission on a physical downlink shared channel (PDSCH) is allocated for LTE signalling in the subframe, then the LTE control information of the muted symbol might be transmitted to the same range of PRBs of the PDSCH.

As disclosed above, according a compensation scheme, the transmission power of the LTE control information is boosted at another symbol in the subframe. That is, in some aspects, in order to compensate for muting of the transmission power of the LTE control information in the symbol at index 1 in the subframe, the transmission power of the LTE control information in another symbol in the subframe is boosted. That is, in some aspects, the network node 200 is configured to perform (optional) step S108ac as part of initiating the transmission of the subframe in step S108:

S108ac: The network node 200 initiates boosting transmission power of LTE control information in the symbol at another index than index 1 in the subframe.

There could be different ways in which the transmission power is boosted. In some aspects, the boosting is proportional to the muting. That is, in some embodiments, how much the transmission power of the LTE control information is boosted is proportional to how much the transmission power of the LTE control information in the LTE control information in the symbol at index 1 is muted.

There could be different symbols whose transmission power is boosted. In some aspects, the symbol at index 8 has its transmission power boosted. That is, in some embodiments, the another index specified in step S108ac is index 8 in the subframe. In some aspects, the LTE control information in the symbol at index 8 is CRS. Boosting the transmission power of the CRS in the symbol at index 8 in the subframe may compensate for cell measurements, in case a user equipment configured to receive the LTE signalling incorporates measurements of the CRSs over the entire cell bandwidth in quality reports sent to the network node 200.

In some aspects, the NR control information and the LTE control information is transmitted from co-sited antennas 140a, 140b. In particular, in some embodiments, transmission of the subframe is, in step S108, initiated from co-sited antennas 140a, 140b. The resource elements for LTE transmission and the resource elements for NR transmission are then to be transmitted from the co-sited antennas 140a, 140b. In some aspects, both the NR control information and the LTE control information is transmitted from the same antenna. That is, in some embodiments, the resource elements of LTE transmission and the resource elements for NR transmission are combined on each antenna 140a, 140b of the co-sited antennas 140a, 140b. In other aspects, the LTE control information and the NR control information are transmitted from separate antennas. That is, in some embodiments, the resource elements for LTE transmission are transmitted from a first antenna 140*a* of the co-sited antennas 140*a*, 140*b* and the resource elements for NR transmission are transmitted from a second antenna 140*b* of the co-sited antennas 140*a*, 14*ob*.

Figure 4:
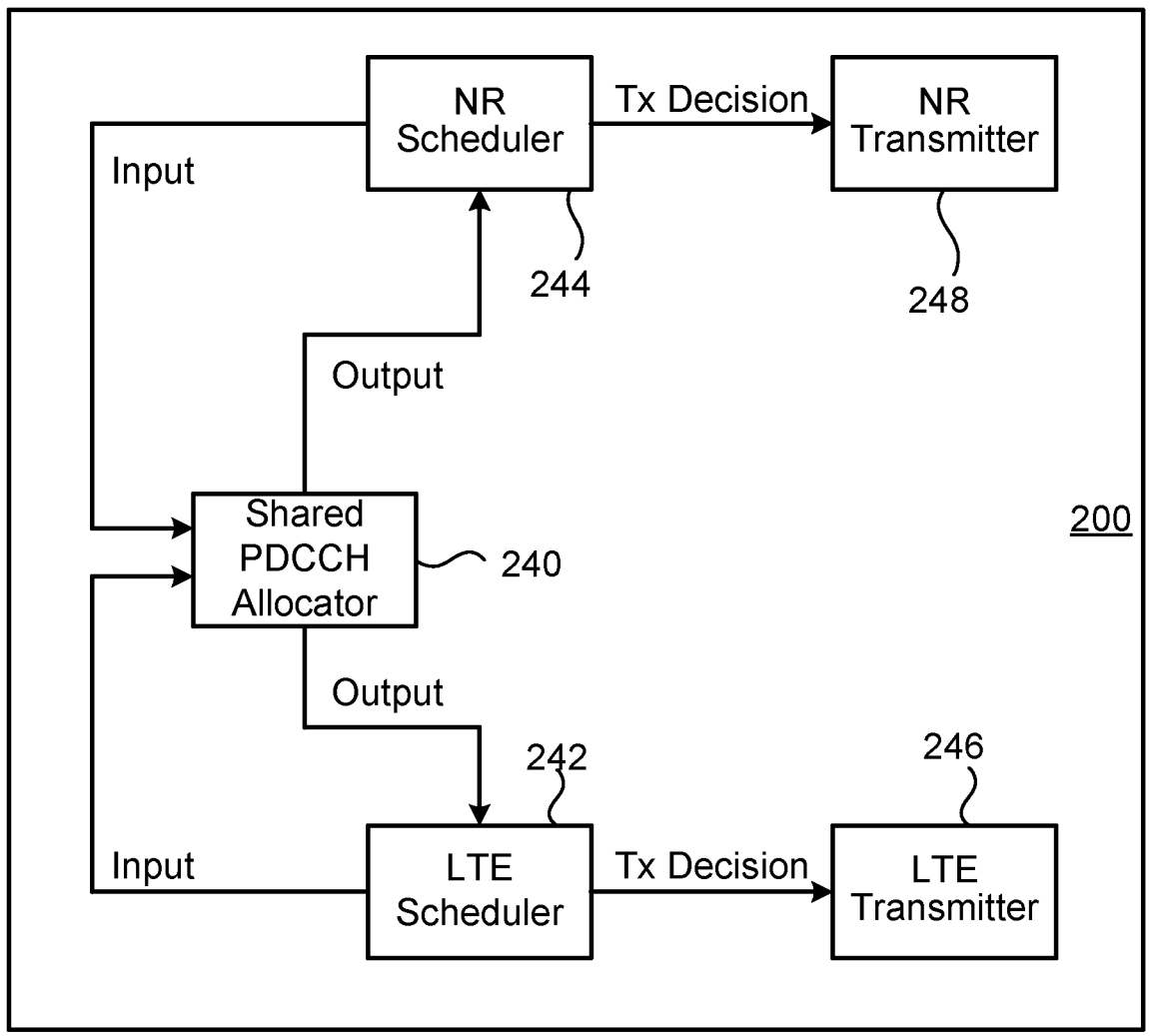
FIG. 4 schematically illustrates a block diagram of a network node according to an embodiment.

FIG. 4 schematically illustrates a block diagram of a network node 200 having a shared PDCCH allocator 240, an LTE scheduler 242, and an NR scheduler 244, together with an LTE transmitter 246 and an NR transmitter 248. The LTE transmitter 246 might comprise, or be operatively connected to, at least the first antenna 140*a*. The NR transmitter 248 might comprise, or be operatively connected to, at least the second antenna 140*b*. The shared PDCCH allocator 240 is configured to, based on input from the LTE scheduler 242 and the NR scheduler 244 take a decision in terms of configuring resource elements for transmission of LTE control information and resource elements for transmission of NR control information within the subframe, as in step S104. Transmission of the subframe, as in step S108, is initiated by the shared PDCCH allocator 240 providing output to the LTE scheduler 242 and the NR scheduler 244. The output defines which (or at least how many) resource elements in each subframe are configured for LTE transmission, in terms of LTE control information, and which (or at least how many) resource elements in each subframe are configured for NR transmission, in terms of NR control information. The LTE scheduler 242 is configured to, based on the output received from the shared PDCCH allocator 240, schedule the LTE transmission and initiate transmission of the LTE transmission from the LTE transmitter 246. The NR scheduler 244 is configured to, based on the output received from the shared PDCCH allocator 240, schedule NR transmission and initiate transmission of the NR transmission from the NR transmitter 248.

Figure 5:
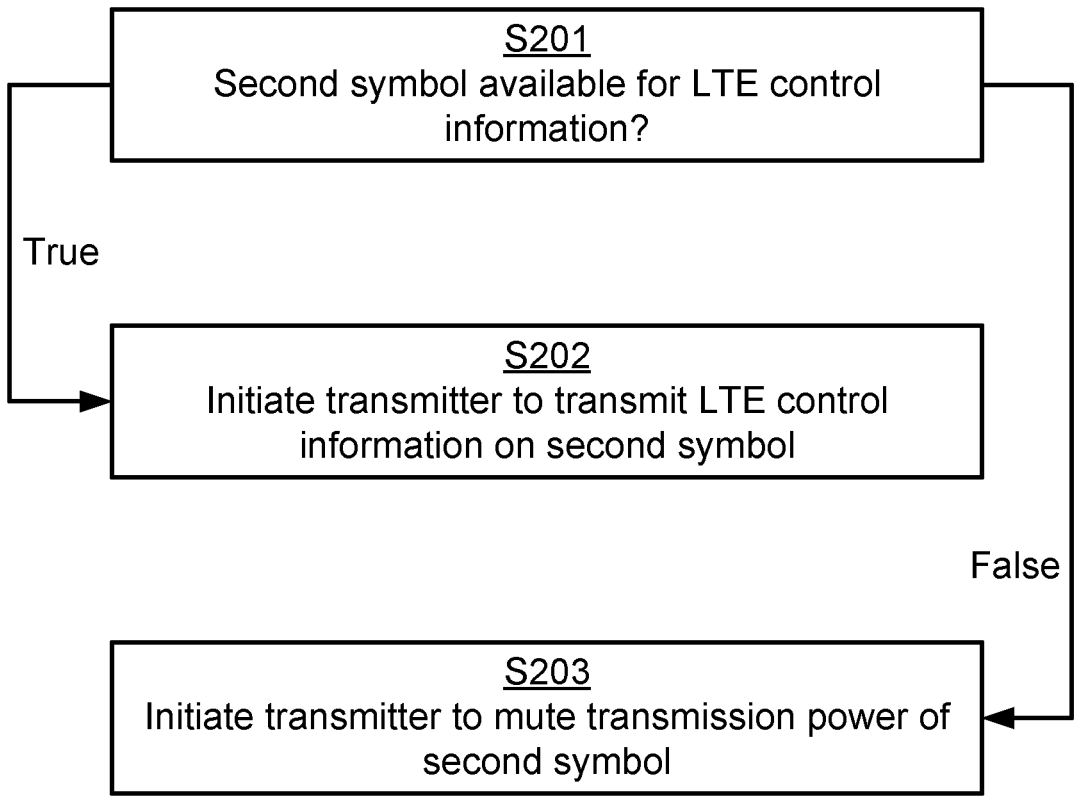
Figure 6:
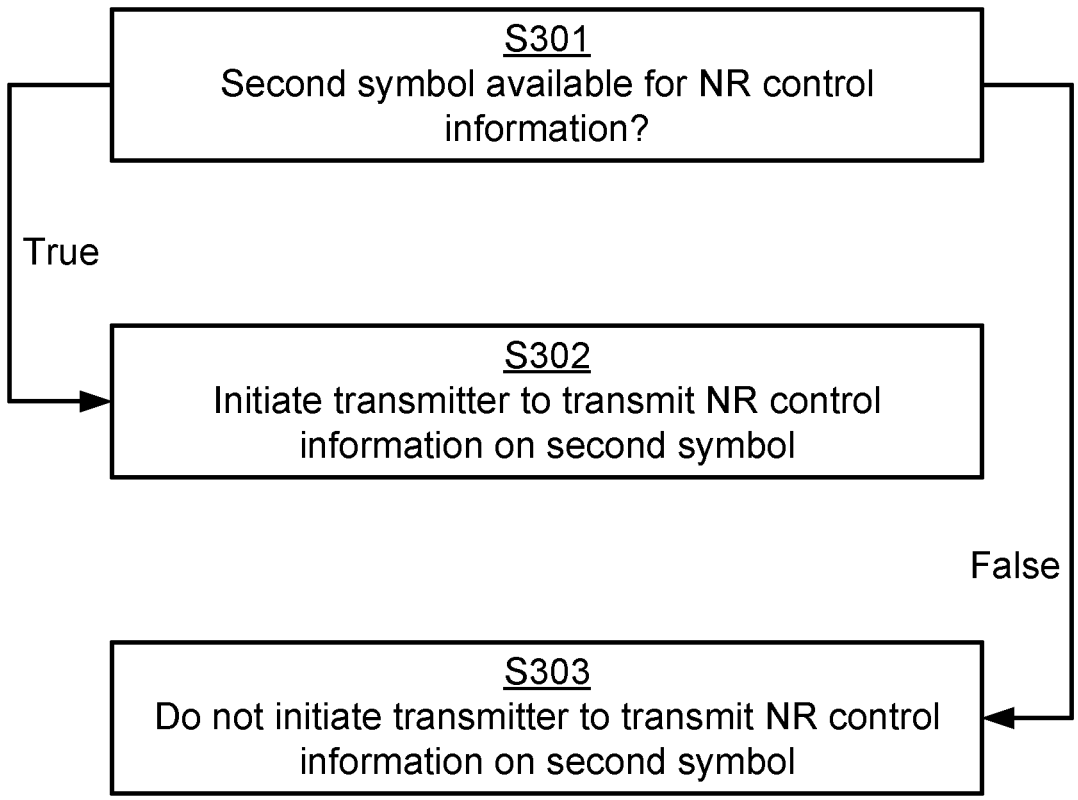
Figure 7:
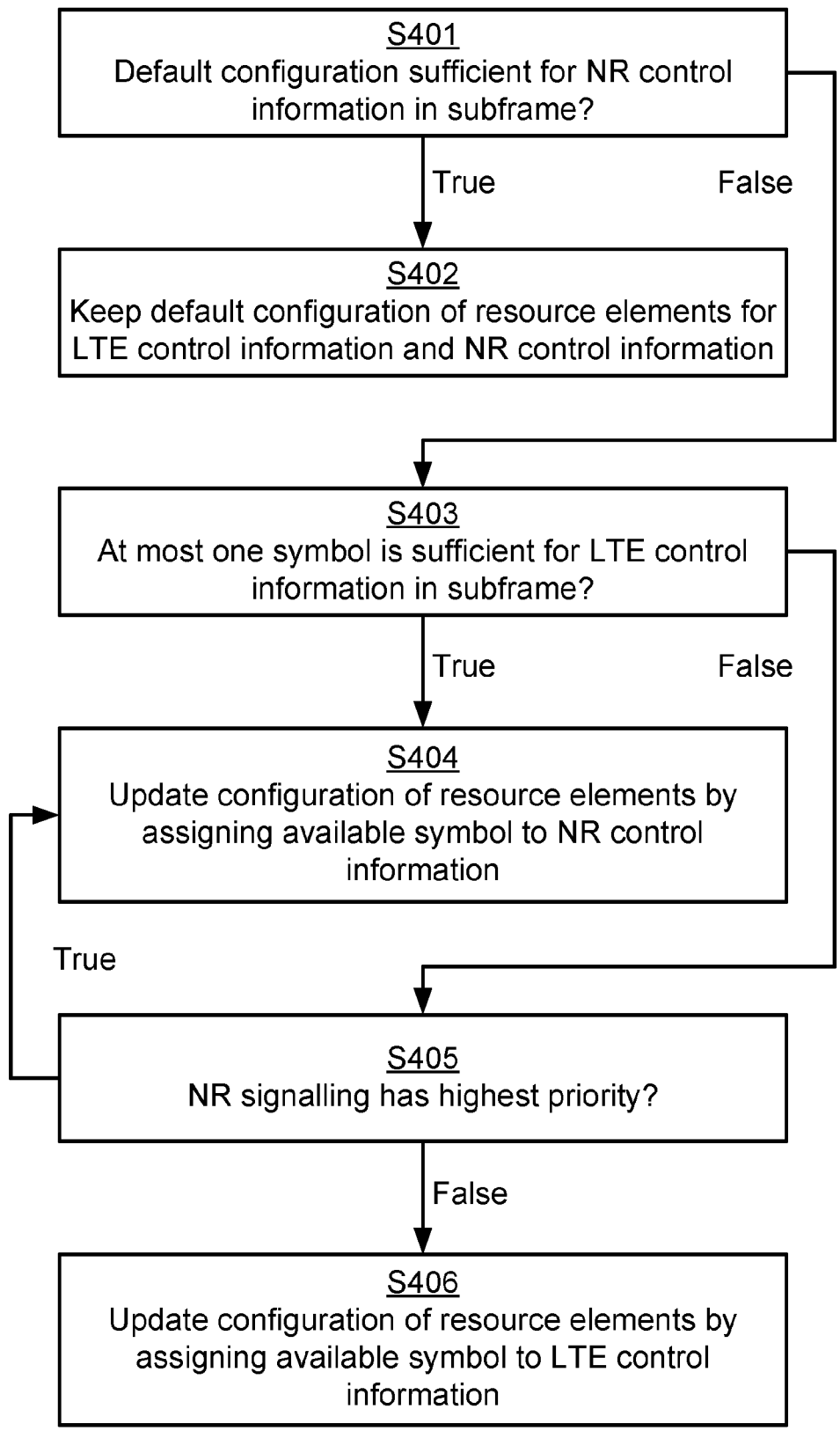

Flowcharts for each of the LTE scheduler 242, the NR scheduler 244, and the shared PDCCH allocator 240 will now be disclosed in turn with reference to FIGS. 5, 6, and 7.

One particular embodiment for transmission of NR control information in an LTE downlink subframe based on at least some of the above disclosed embodiments, as applicable to the LTE scheduler 242, will now be disclosed with reference to the flowchart of FIG. 5.

S201: The LTE scheduler 242 receives information of availability of a second symbol for LTE control information (i.e., the symbol with index 1). If the second symbol is available for LTE control information: enter step S202: If the second symbol is not available for LTE control information: enter step S203.

S202: The LTE scheduler 242 initiates the LTE transmitter 246 to transmit LTE control information on the second symbol.

S203: The LTE scheduler 242 initiates the LTE transmitter 246 to mute transmission power of the second symbol. Optionally, the LTE scheduler 242 initiates an LTE transmitter 246 to boost transmission power of the ninth symbol.

One particular embodiment for transmission of NR control information in an LTE downlink subframe based on at least some of the above disclosed embodiments, as applicable to the NR scheduler 244, will now be disclosed with reference to the flowchart of FIG. 6.

S301: The NR scheduler 244 receives information of availability of a second symbol for NR control information. If the second symbol is available for NR control information: enter step S302: If the second symbol is not available for NR control information: enter step S303.

S302: The NR scheduler 244 initiates the NR transmitter 248 to transmit NR control information on the second symbol.

S303: The NR scheduler 244 does not initiate any transmission of NR control information on the second symbol.

One particular embodiment for transmission of NR control information in an LTE downlink subframe based on at least some of the above disclosed embodiments, as applicable to the shared PDCCH allocator 240, will now be disclosed with reference to the flowchart of FIG. 7.

S401: A check is made whether not the default configuration is sufficient for NR control information in the subframe, for example whether or not one symbol is sufficient for NR control information in the subframe. If one symbols is sufficient: enter step S402. If one symbol is not sufficient: enter step S403. In general terms, whether or not one symbol is sufficient for NR control information in the subframe could be based on information obtained by the shared PDCCH allocator 240 from the NR scheduler 244. In turn, this information could relate to a resource demand as estimated by NR scheduler 244 in terms of NR traffic requirements.

S402: The default configuration of resource elements for LTE control information and NR control information in the subframe is kept. In some aspects the default configuration defines two symbols for for LTE control information and one symbol for NR control information within the subframe.

S403: A check is made whether or not at most one symbol is sufficient for LTE control information in the subframe. If one symbols is sufficient: enter step S404. If one symbol is not sufficient: enter step S405. In general terms, whether or not one symbol is sufficient for LTE control information in the subframe could be based on information obtained by the shared PDCCH allocator 240 from the LTE scheduler 242. In turn, this information could relate to a resource demand as estimated by LTE scheduler 242 in terms of LTE traffic requirements.

S404: One symbol is to be reallocated from LTE control information to NR control information. The configuration of resource elements is updated by assigning the available symbol to NR control information. Indicate to NR scheduler 244 that two symbols are available for NR control information. Indicate to LTE scheduler 242 that only one symbol is available for LTE control information S405: A check is made whether NR signalling or LTE signalling has highest priority. If NR signalling has highest priority: enter step S404. If LTE signalling has highest priority: enter step S406.

S406: One (additional) symbol is available for LTE control information. The configuration of resource elements is updated by assigning the available symbol to LTE control information. Indicate to NR scheduler 244 that only one symbols is available for NR control information. Indicate to LTE scheduler 242 that two symbols are available for LTE control information.

Figure 1:
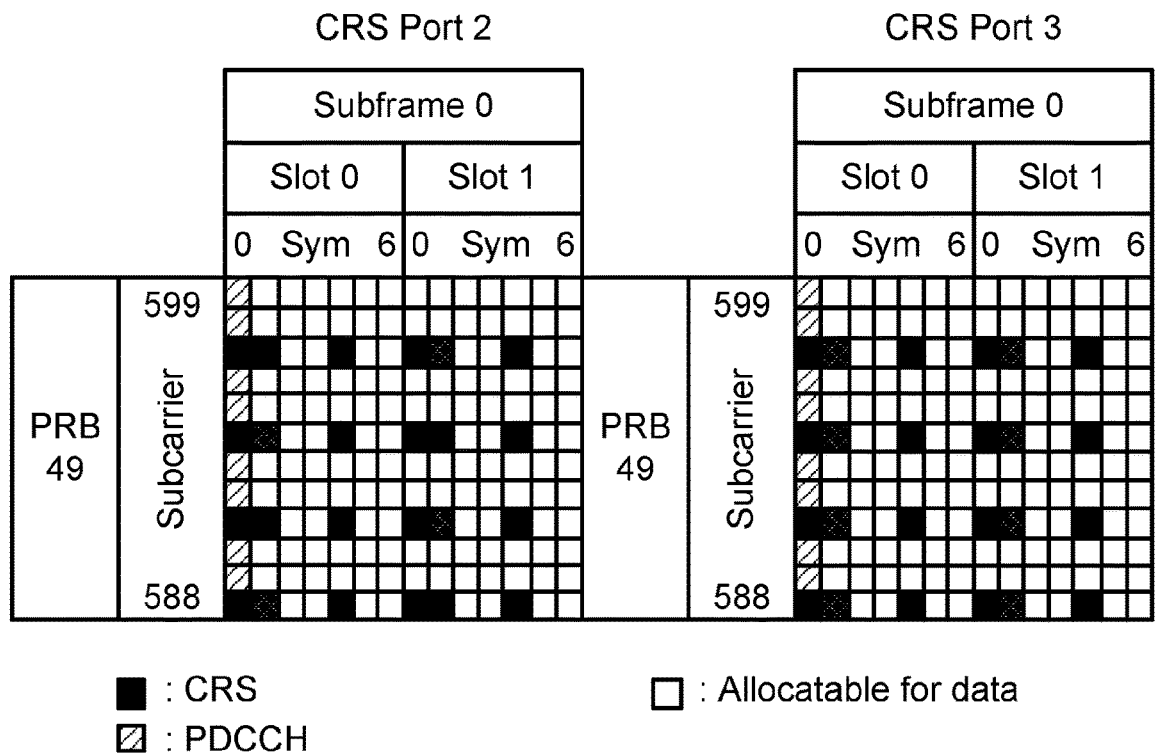
FIG. 1 schematically illustrates parts of a subframe.
Figure 8:
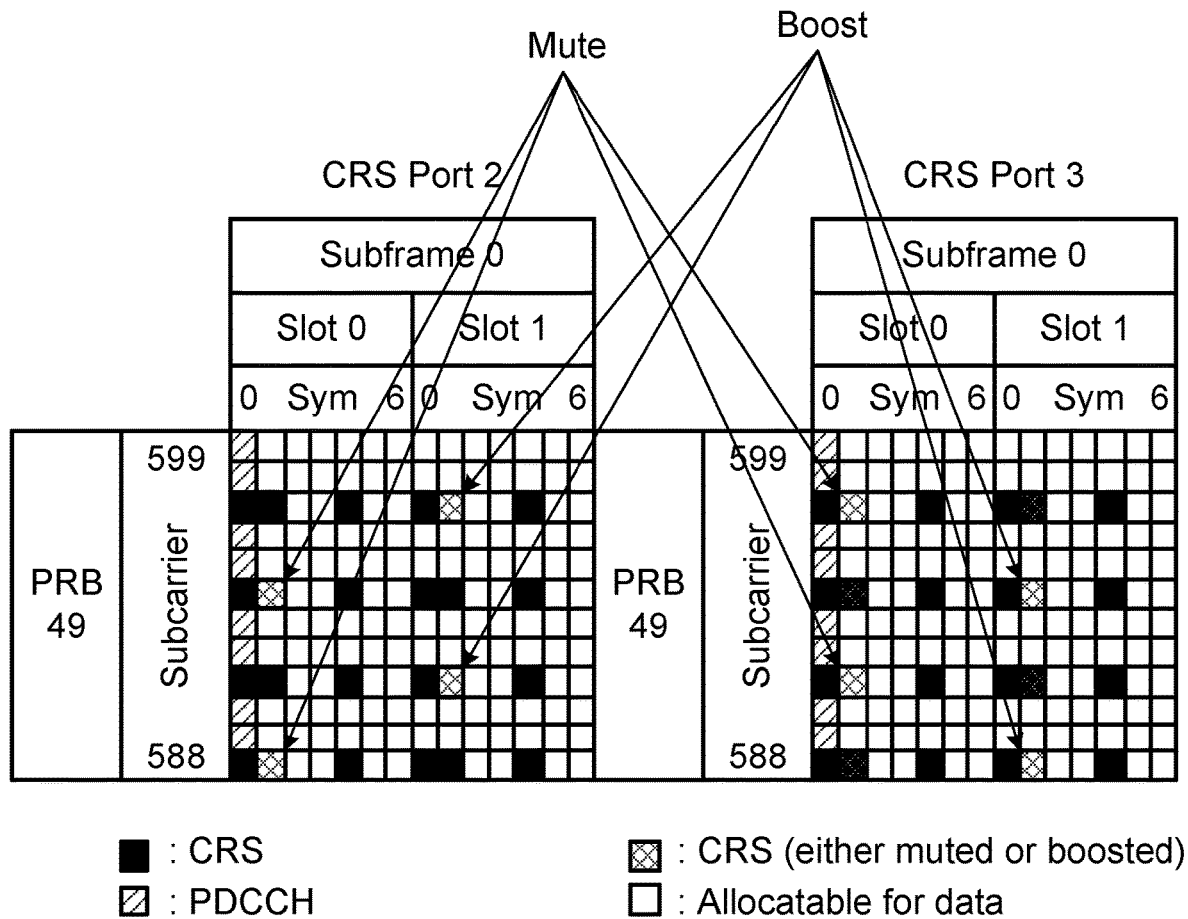
FIG. 8 schematically illustrates parts of a subframe according to an embodiment.

FIG. 8 illustrates the same parts of the subframe in terms of the LTE CRS for port index 2 and port index 3 as in FIG. 1, but where transmission power of the LTE control information in the symbol at index 1 is muted and where transmission power of the LTE control information in the symbol at index 8 is boosted. This enables NR control information to be transmitted in the symbol at index 1.

Figure 9:
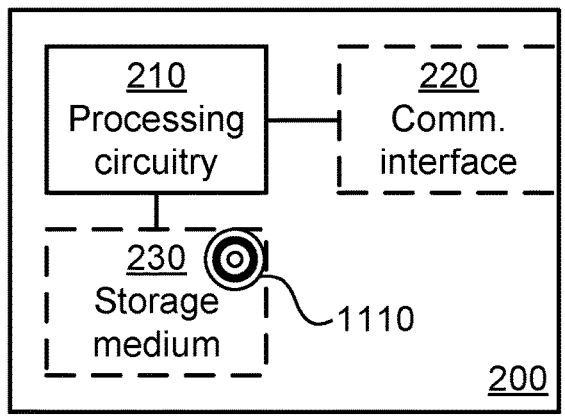
FIG. 9 is a schematic diagram showing functional units of a network node according to an embodiment.

FIG. 9 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1110 (as in FIG. 11), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or steps, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The network node 200 may further comprise a communications interface 220 at least configured for communications with other entities, functions, nodes, and devices, such as the antenna system and its co-sited antennas 140a, 140b and the core network 120. As such the communications interface 220 may comprise one or more transmitters and receivers, comprising analogue and digital components. The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 10:
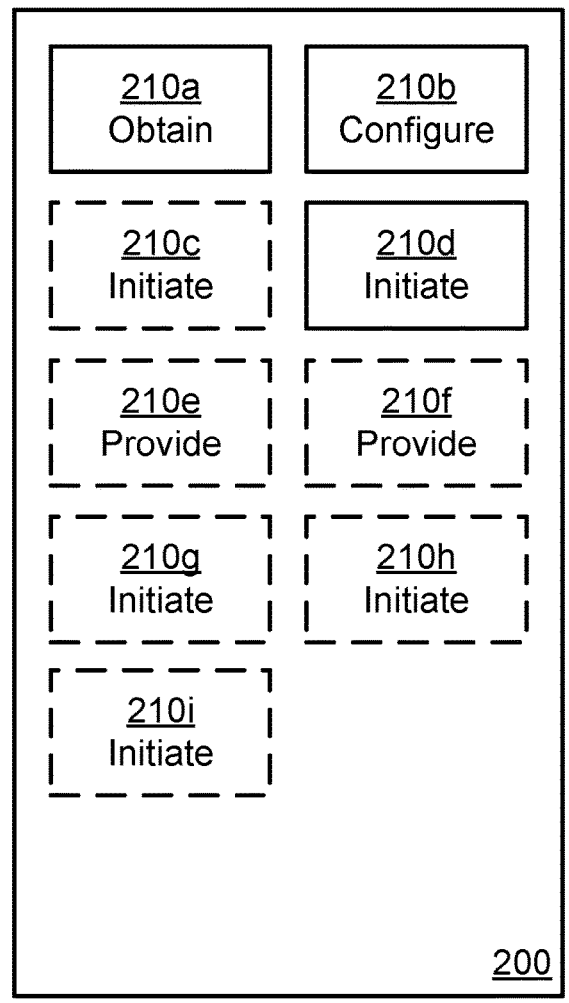
FIG. 10 is a schematic diagram showing functional modules of a network node according to an embodiment.

FIG. 10 schematically illustrates, in terms of a number of functional modules, the components of a network node 200 according to an embodiment. The network node 200 of FIG. 10 comprises a number of functional modules; an obtain module 210a configured to perform step S102, a configure module 210b configured to perform step S104, and an initiate module 210d configured to perform step S108. The network node 200 of FIG. 10 may further comprise a number of optional functional modules, such as any of an initiate module 210c configured to perform step S106, a provide module 210e configured to perform step S108aa, a provide module 210f configured to perform step S108ba, an initiate module 210g configured to perform step S108ab, an initiate module 210h configured to perform step S108bb, an initiate module 210i configured to perform step S108ac.

In general terms, each functional module 210a:210i may in one embodiment be implemented only in hardware and in another embodiment with the help of software, i.e., the latter embodiment having computer program instructions stored on the storage medium 230 which when run on the processing circuitry makes the network node 200 perform the corresponding steps mentioned above in conjunction with FIG. 10. It should also be mentioned that even though the modules correspond to parts of a computer program, they do not need to be separate modules therein, but the way in which they are implemented in software is dependent on the programming language used. Preferably, one or more or all functional modules 210a:210i may be implemented by the processing circuitry 210, possibly in cooperation with the communications interface 220 and/or the storage medium 230. The processing circuitry 210 may thus be configured to from the storage medium 230 fetch instructions as provided by a functional module 210a:210i and to execute these instructions, thereby performing any steps as disclosed herein.

The network node 200 may be provided as a standalone device or as a part of at least one further device. For example, the network node 200 may be provided in a node of the radio access network or in a node of the core network. Alternatively, functionality of the network node 200 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time.

Thus, a first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 9 the processing circuitry 210 may be distributed among a plurality of devices, or nodes. The same applies to the functional modules 210a:210i of FIG. 10 and the computer program 1120 of FIG. 11.

Figure 11:
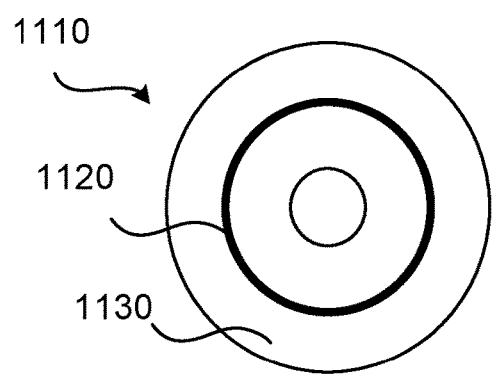
FIG. 11 shows one example of a computer program product comprising computer readable storage medium according to an embodiment.

FIG. 11 shows one example of a computer program product 1110 comprising computer readable storage medium 1130. On this computer readable storage medium 1130, a computer program 1120 can be stored, which computer program 1120 can cause the processing circuitry 210 and thereto operatively coupled entities and devices, such as the communications interface 220 and the storage medium 230, to execute methods according to embodiments described herein. The computer program 1120 and/or computer program product 1110 may thus provide means for performing any steps as herein disclosed.

In the example of FIG. 11, the computer program product 1110 is illustrated as an optical disc, such as a CD (compact disc) or a DVD (digital versatile disc) or a Blu-Ray disc. The computer program product 1110 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1120 is here schematically shown as a track on the depicted optical disk, the computer program 1120 can be stored in any way which is suitable for the computer program product 1110.

Figure 12:
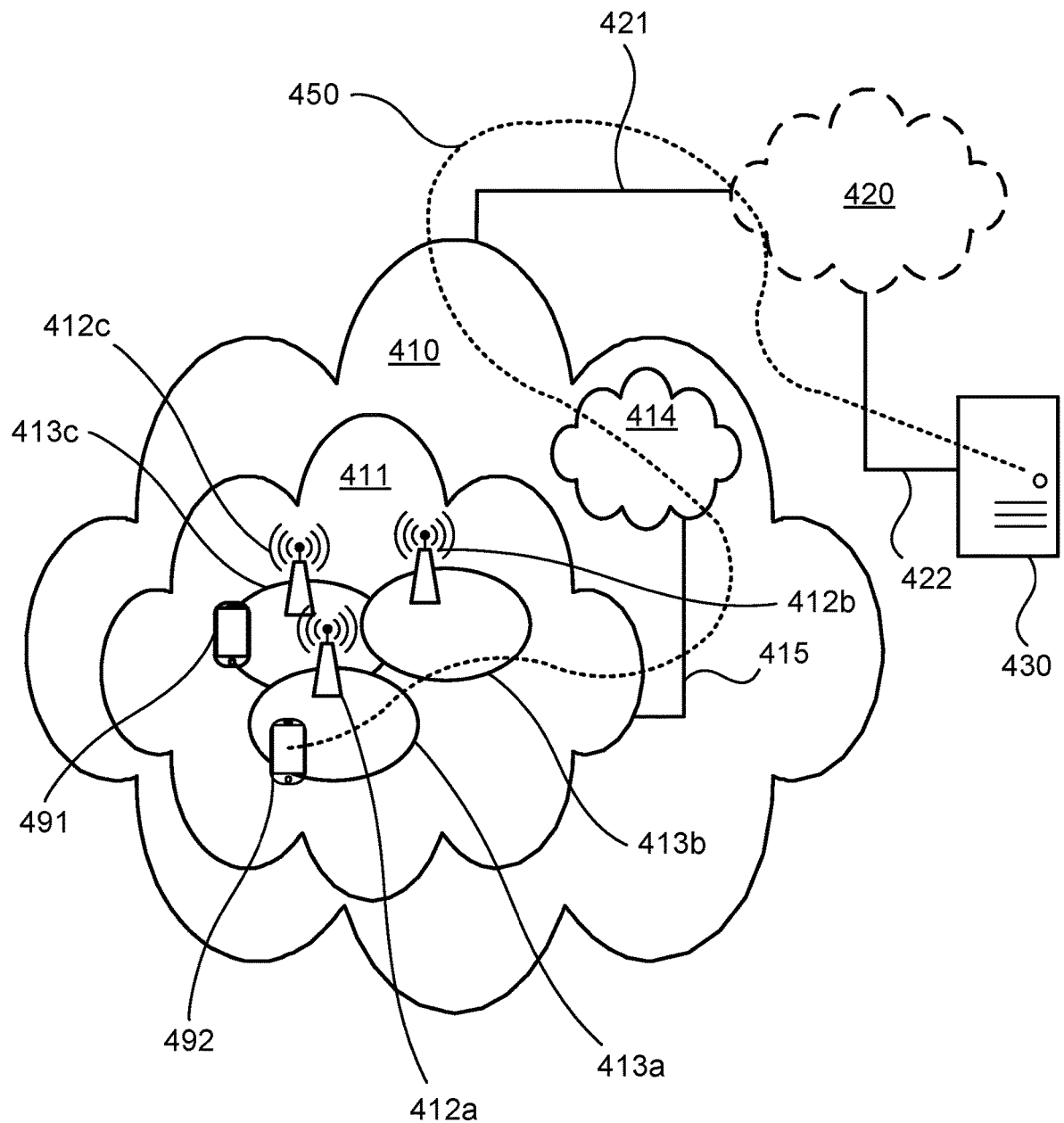
FIG. 12 is a schematic diagram illustrating a telecommunication network connected via an intermediate network to a host computer in accordance with some embodiments.

FIG. 12 is a schematic diagram illustrating a telecommunication network connected via an intermediate network 420 to a host computer 430 in accordance with some embodiments. In accordance with an embodiment, a communication system includes telecommunication network 410, such as a 3GPP-type cellular network, which comprises access network 411, such as radio access network 110 in FIG. 1, and core network 414, such as core network 120 in FIG. 2. Access network 411 comprises a plurality of radio access network nodes 412a, 412b, 412c, such as NBs, eNBs, gNBs (each corresponding to the network node 200 of FIG. 2) or other types of wireless access points, each defining a corresponding coverage area, or cell, 413a, 413b, 413c. Each radio access network nodes 412a, 412b, 412c is connectable to core network 414 over a wired or wireless connection 415. A first UE 491 located in coverage area 413c is configured to wirelessly connect to, or be paged by, the corresponding network node 412c. A second UE 492 in coverage area 413a is wirelessly connectable to the corresponding network node 412a. While a plurality of UE 491, 492 are illustrated in this example, the disclosed embodiments are equally applicable to a situation where a sole UE is in the coverage area or where a sole terminal device is connecting to the corresponding network node 412. The UEs 491, 492 correspond to the user equipment 150a, 150b, 150c of FIG. 2.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 12 as a whole enables connectivity between the connected UEs 491, 492 and host computer 430. The connectivity may be described as an over-the-top (OTT) connection 450. Host computer 430 and the connected UEs 491, 492 are configured to communicate data and/or signalling via OTT connection 450, using access network 411, core network 414, any intermediate network 420 and possible further infrastructure (not shown) as intermediaries. OTT connection 450 may be transparent in the sense that the participating communication devices through which OT connection 450 passes are unaware of routing of uplink and downlink communications. For example, network node 412 may not or need not be informed about the past routing of an incoming downlink communication with data originating from host computer 430 to be forwarded (e.g., handed over) to a connected UE 491. Similarly, network node 412 need not be aware of the future routing of an outgoing uplink communication originating from the UE 491 towards the host computer 430.

Figure 13:
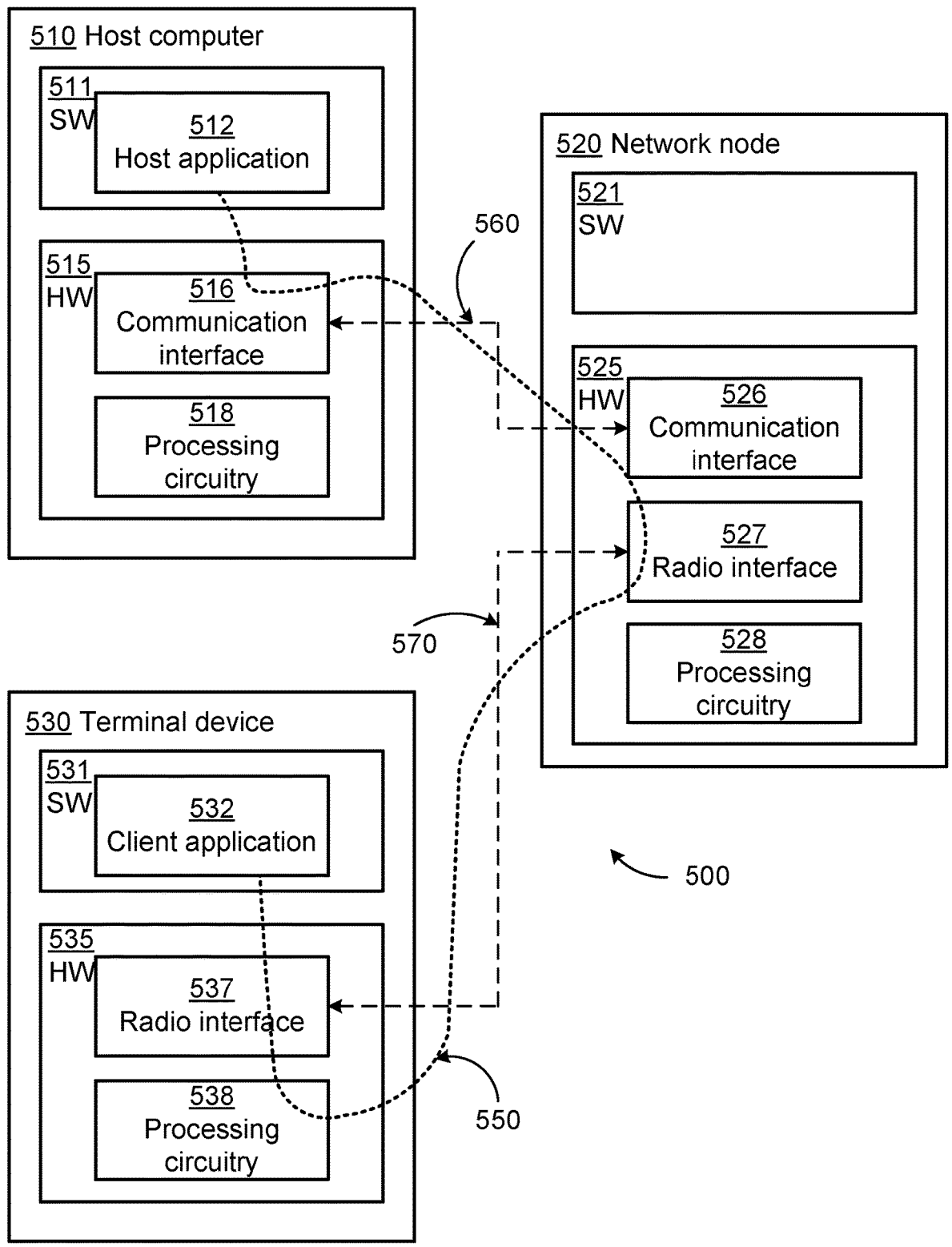
FIG. 13 is a schematic diagram illustrating host computer communicating via a radio base station with a terminal device over a partially wireless connection in accordance with some embodiments.

FIG. 13 is a schematic diagram illustrating host computer communicating via a radio access network node with a UE over a partially wireless connection in accordance with some embodiments. Example implementations, in accordance with an embodiment, of the UE, radio access network node and host computer discussed in the preceding paragraphs will now be described with reference to FIG. 13. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. The UE 530 corresponds to the user equipment 150a, 150b, 150c of FIG. 2. In providing the service to the remote user, host application 512 may provide user data which is transmitted using OT connection 550.

Communication system 500 further includes radio access network node 520 provided in a telecommunication system and comprising hardware 525 enabling it to communicate with host computer 510 and with UE 530. The radio access network node 520 corresponds to the network node 200 of FIG. 2. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 13) served by radio access network node 520. Communication interface 526 may be configured to facilitate connection 560 to host computer 510. Connection 560 may be direct or it may pass through a core network (not shown in FIG. 13) of the telecommunication system and/or through one or more intermediate networks outside the telecommunication system. In the embodiment shown, hardware 525 of radio access network node 520 further includes processing circuitry 528, which may comprise one or more programmable processors, application-specific integrated circuits, field programmable gate arrays or combinations of these (not shown) adapted to execute instructions. Radio access network node 520 further has software 521 stored internally or accessible via an external connection.

Communication system 500 further includes UE 530 already referred to. Its hardware 535 may include radio interface 537 configured to set up and maintain wireless connection 570 with a radio access network node serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, radio access network node 520 and UE 530 illustrated in FIG. 13 may be similar or identical to host computer 430, one of network nodes 412*a*, 412*b*, 412*c* and one of UEs 491, 492 of FIG. 12, respectively. This is to say, the inner workings of these entities may be as shown in FIG. 13 and independently, the surrounding network topology may be that of FIG. 12.

In FIG. 13, OTT connection 550 has been drawn abstractly to illustrate the communication between host computer 510 and UE 530 via network node 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and radio access network node 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may reduce interference, due to improved classification ability of airborne UEs which can generate significant interference.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect network node 520, and it may be unknown or imperceptible to radio access network node 520. Such procedures and functionalities may be known and practiced in the art. In certain embodiments, measurements may involve proprietary UE signalling facilitating host computer's 510 measurements of throughput, propagation times, latency and the like. The measurements may be implemented in that software 511 and 531 causes messages to be transmitted, in particular empty or 'dummy' messages, using OTT connection 550 while it monitors propagation times, errors etc.

The inventive concept has mainly been described above with reference to a few embodiments. However, as is readily appreciated by a person skilled in the art, other embodiments than the ones disclosed above are equally possible within the scope of the inventive concept, as defined by the appended list of enumerated embodiments.

The invention claimed is:

1. A method for transmission of New Radio, NR, control information in a Long Term Evolution, LTE, downlink subframe, wherein at least two symbols in the subframe are allocatable for LTE control information, the method being performed by a network node, the method comprising:
   obtaining information that the symbol at index 1 in the subframe allocatable for LTE control information is to be allocated to the NR control information, and in response thereto:
      configuring resource elements for LTE transmission and resource elements for NR transmission within the subframe, wherein the resource elements for LTE transmission in the symbol at index 1 in the subframe are to be muted, and the NR control information is allocated to resource elements of the symbol at index 1 in the subframe; and
   initiating transmission of the subframe.

2. The method according to claim 1, wherein initiating the transmission of the subframe comprises:
   providing information of the configured resource elements for the LTE transmission to a scheduler of the LTE control information; and
   providing information of the configured resource elements for the NR transmission to a scheduler of the NR control information.

3. The method according to claim 1, wherein initiating the transmission of the subframe comprises:
   initiating, for a transmitter of the LTE control information, muting of the LTE control information in the symbol at index 1 in the subframe; and
   initiating, for a transmitter of the NR control information, transmission of the NR control Information in the symbol at index 1 in the subframe.

4. The method according to claim 1, wherein the information specifies a range of physical resource blocks, PRBs, in which the symbol at index 1 in the subframe allocatable for LTE control information is to be allocated to the NR control information, and wherein muting of the LTE control information is initiated only for the specified range of PRBs.

5. The method according to claim 1, wherein initiating the transmission of the subframe comprises:
   initiating boosting transmission power of LTE control information in the symbol at another index than index 1 in the subframe.

6. The method according to claim 5, wherein how much the transmission power of the LTE control information is boosted is proportional to how much the transmission power of the LTE control information in the LTE control information in the symbol at index 1 is muted.

7. The method according to claim 5, wherein said another index is index 8 in the subframe.

8. The method according to claim 1, wherein that the symbol at index 1 in the subframe allocatable for LTE control information is to be allocated to the NR control information is a result of a scheduling decision taken for the LTE control information and the NR control information.

9. The method according to claim 8, wherein the scheduling decision is based on a condition comparing a need for NR traffic to a need for LTE traffic.

10. The method according to claim 9, wherein the condition pertains to relative priority between the NR traffic and the LTE traffic, and wherein, as a result of the NR traffic having highest relative priority, the symbol at index 1 in the subframe is to be allocated to the NR control information.

11. The method according to claim 1, wherein the method further comprises:
   initiating transmission of a notification to user equipment monitoring the LTE control information that the user equipment should refrain from monitoring the symbol at index 1 in the subframe.

12. The method according to claim 1, wherein the LTE control Information is transmitted on an LTE physical downlink control channel, PDCCH.

13. The method according to claim 12, wherein the LTE control Information is a cell-specific reference signal, CRS.

14. The method according to claim 1, wherein the NR control information is transmitted on an NR physical downlink control channel, PDCCH.

15. The method according to claim 1, wherein transmission of the subframe is initiated from co-sited antennas, and wherein the resource elements for LTE transmission and the resource elements for NR transmission are to be transmitted from the co-sited antennas.

16. The method according to claim 15, wherein the resource elements for LTE transmission and the resource elements for NR transmission are combined on each antenna of the co-sited antennas.

17. The method according to claim 15, wherein the resource elements for LTE transmission are transmitted from a first antenna of the co-sited antennas and the resource elements for NR transmission are transmitted from a second antenna of the co-sited antennas.

18. A network node for transmission of New Radio, NR, control information in a Long Term Evolution, LTE, downlink subframe, wherein at least two symbols in the subframe are allocatable for LTE control information, the network node comprising processing circuitry and memory containing instructions executable by the processing circuitry to cause the network node to:

obtain information that the symbol at index 1 in the subframe allocatable for LTE control information is to be allocated to the NR control information, and in response thereto:

configure resource elements for LTE transmission and resource elements for NR transmission within the subframe, wherein the resource elements for LTE transmission in the symbol at index 1 in the subframe are to be muted, and the NR control information is allocated to resource elements of the symbol at index 1 in the subframe; and initiate transmission of the subframe.

\* \* \* \* \*